J. M. WELLINGTON AND D. G. MACKENZIE.
GRAB.
APPLICATION FILED FEB. 27, 1920.

1,416,768.

Patented May 23, 1922.
6 SHEETS—SHEET 1.

INVENTORS
John M. Wellington.
Duncan G. Mackenzie
By Wm Wallace White ATTY.

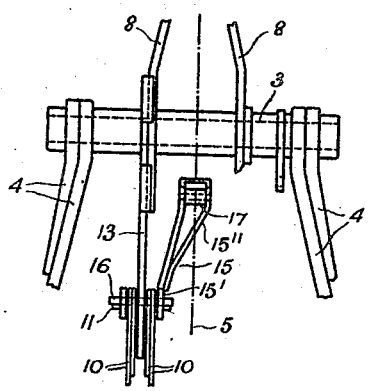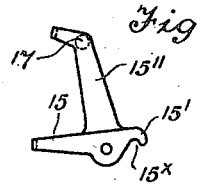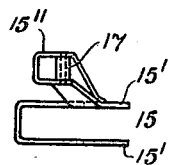

UNITED STATES PATENT OFFICE.

JOHN MORECRAFT WELLINGTON AND DUNCAN GORDON MACKENZIE, OF ILFORD, ENGLAND.

GRAB.

1,416,768. Specification of Letters Patent. Patented May 23, 1922.

Application filed February 27, 1920. Serial No. 361,754.

*To all whom it may concern:*

Be it known that we, JOHN MORECRAFT WELLINGTON and DUNCAN GORDON MACKENZIE, subjects of the King of Great Britain and Ireland, residing at 24 Empress Avenue, Ilford, in the county of Essex, England, have invented certain new and useful Improvements in Grabs, of which the following is a specification.

The invention relates to grabs of the single-chain type.

One of the drawbacks of grabs of this kind, whether single-purchase or double-purchase grabs, is the necessity of having to use a ball-button or equivalent device.

The object of the present invention is to obviate the use of a ball-button or equivalent device, and is attained by so constructing a grab that the angular position of the suspending hook thereof will be controlled from the buckets of the grab.

The invention will be described in its application to a double-purchase grab of the single-chain type commonly in use, in which the head spindle of the grab approaches the bucket spindle as the buckets are closed on the material to be raised and retires therefrom when the buckets are opened out.

The invention is illustrated by the accompanying drawings.

Fig. 5 is a fractional side view, Figs. 7 and 8 are a side view and a plan of the locking lever used in said modified construction of grab.

Figure 1:
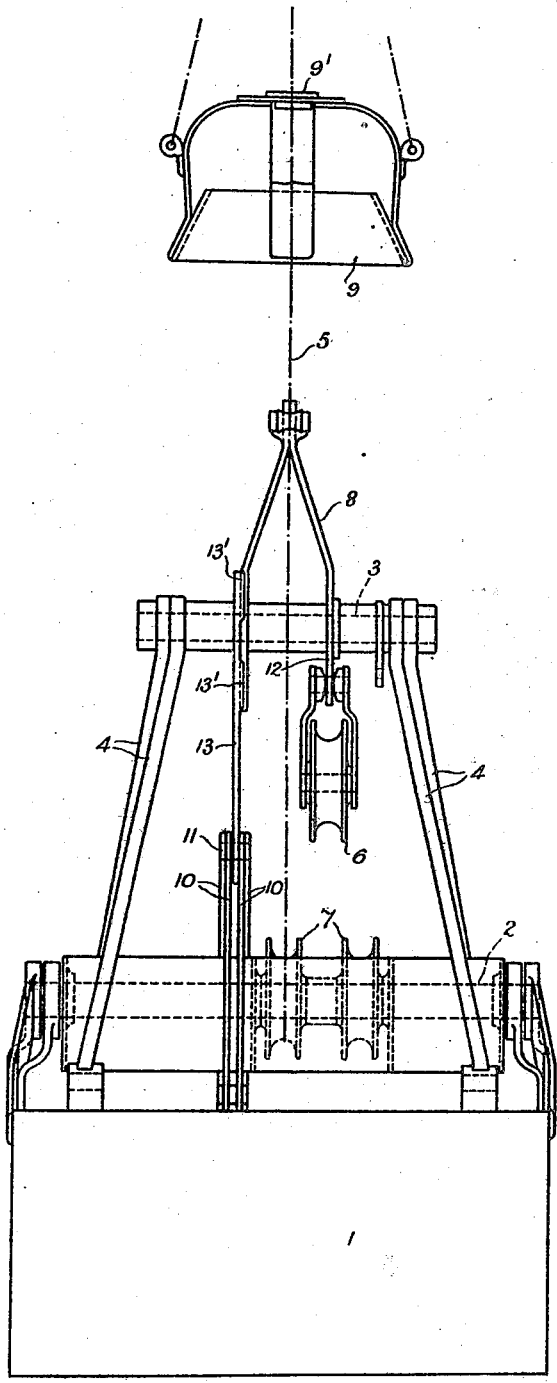
Fig. 1 is a side view and Fig. 2 is an end view illustrating the application of the invention to a double-purchase grab of the single-chain type, the buckets of the grab being shown closed.

1 are the buckets of the grab, mounted on the spindle 2. 3 is the head spindle of the grab, 4 are operating links connecting the buckets 1 to the head spindle 3. 5 is the lifting rope or chain of the grab, and 6 is the upper sheave and 7 are the lower sheaves for the lifting rope or chain 5. 8 is the suspending hook, and 9 is the opening ring or bonnet.

All of the above enumerated parts are of known construction with the exception of the particular construction of the suspending hook 8.

According to the present invention a grab of the above referred to type, or of any other type to which the present invention may be applied, is provided with a second pair of links 10, hereinafter called the controlling links, which are made of shorter length than the operating links 4. These controlling links 10, which are, as shown in Fig. 1, disposed in vertical planes and on one side of a vertical line passing through the centre of the grab, are connected at their lower ends to the buckets 1 and are mounted at their upper ends on a short pin 11. The suspending hook 8, mounted, as usual, on the head spindle 3, is provided at one of its sides with a suitably disposed depending arm 12, and at its other side with a second depending arm 13, hereinafter referred to as the tail piece of the hook, which is bent or curved at its lower end. The depending arm 12 supports the upper sheave 6 of the grab, while the bent part of the second depending arm 13 or tail piece of the suspending hook 8 fits between the upper ends of the controlling links 10 and is formed with a cam slot 14 adapted to cooperate with the short pin 11 connecting the upper ends of the controlling links 10. The cam slot 14 comprises a main part 14' of curved shape corresponding to the bent or curved part of the tail piece 13 of the hook 8, and an enlargement $14^{11}$ located at one side of the upper end of the main part of the cam slot. The tail piece 13 of the suspending hook 8 may be formed in one with the rest of the hook, but is preferably, for convenience of construction, made separate therefrom, when it may, as shown in Fig. 1, be mounted on the head spindle 3 by the side of that part of the suspending hook 8 of which it forms an extension, and be operatively connected thereto by means of pairs of lugs $13^1$ formed on its sides and fitting against the sides of the contiguous part of the suspending hook.

The above described parts co-operate as follows:—

Figure 2:
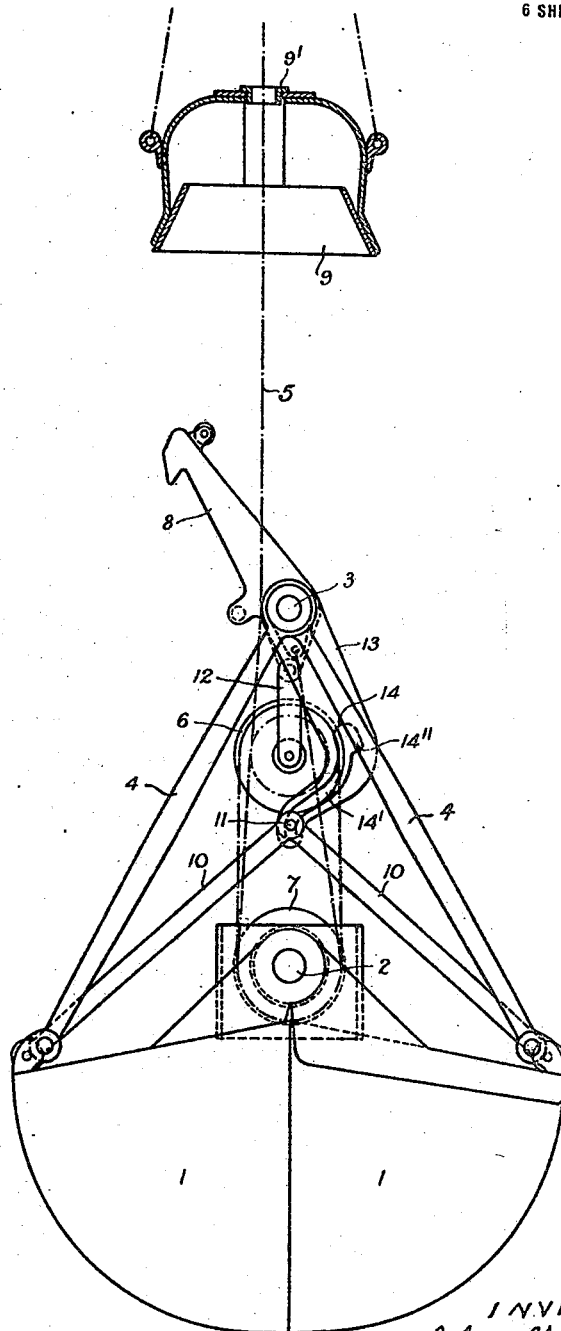
Figure 3:
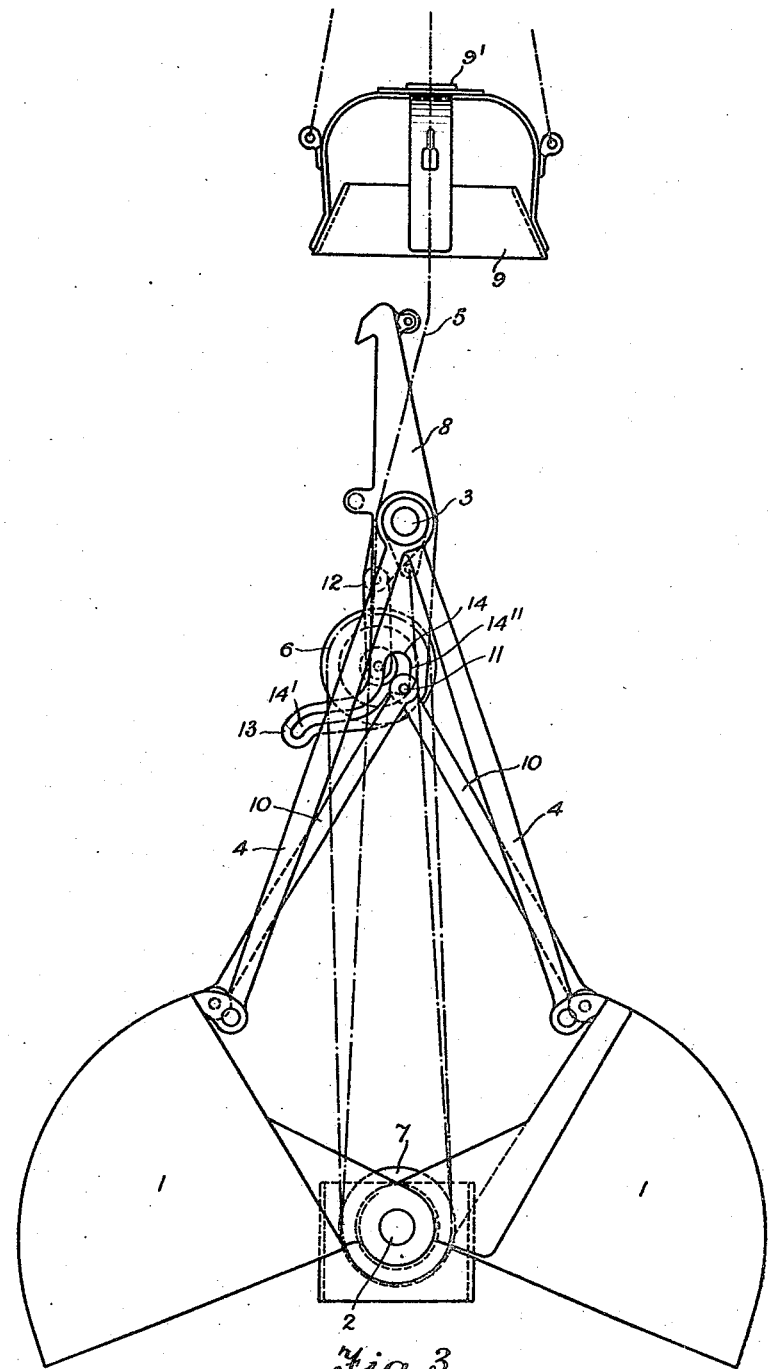
Fig. 3 is a side view of the same grab with the buckets thereof opened.

When the buckets 1 of the improved grab are closed ready for lifting the pin 11 connecting the upper ends of the controlling links 10 will be at or near the lower end of the main part $14^1$ of the cam slot 14 formed in the tail piece 13 of the suspending hook 8, see Fig. 2, and the hook will be inclined at a considerable angle to the vertical centre line of the grab, which will ensure the engagement of the suspending hook 8 with the opening ring or bonnet 9, as the grab is raised. When, after the suspending hook 8 has become engaged with the opening ring or bonnet 9, the lifting rope or chain 5 is slackened, so as to allow the buckets to open out and discharge the load, the suspending hook 8 will rock on the head spindle 3 and the pin 11 connecting the upper ends of the controlling links 10 will travel up the main part $14^1$ of the cam slot 14 in the tail piece 13 of the suspending hook 8 and eventually reach the lateral enlargement $14^{11}$ at the upper end of the slot 14, when the weight of the grab will cause the pin 11 to pass into said enlargement and to rest on the step formed thereby and become locked. The suspending hook 8 will then be vertically disposed and will be disengaged from the opening ring 9 when the grab is raised. When, after the grab has been lowered to the required extent, the buckets come into contact with the material to be raised the lifting rope or chain is slackened. As a result the pin 11 connecting the upper ends of the controlling links 10 is lifted off the step upon which it has been held by the weight of the grab and passes out of the enlargement $14^{11}$ of the cam slot 14 formed in the tail piece 13 of the suspending hook 8. On the lifting rope or chain 5 being pulled upwards the pin 11 will travel down the cam slot 14 and eventually reach the position first above referred to.

Referring now to the modified and preferred construction of parts illustrated by Figs. 4 to 8 the pin 11 connecting the upper ends of the controlling links 10 and cooperating with the cam slot 14 is made of greater length than is shown in Fig. 1 and upon the ends of this pin is loosely mounted a locking lever 15 consisting of more or less horizontally disposed arms $15^1$ and an upstanding arm $15^{11}$. The arms $15^1$ of the locking lever 15 are formed with notches $15^x$ adapted to engage with a pin 16 fixed to the tail piece 13 of the suspending hook 8, while the upstanding arm $15^{11}$ of the locking lever 15 is looped, as shown in Figs. 5 and 8, for the passage of the lifting rope or chain 5, and with a friction roller 17 to serve as an abutment for said rope or chain. Further the bottom wall of the enlargement $14^{11}$ of the cam slot 14 of the tail piece 13 of the suspending hook 8, forming the ledge upon which the pin 11 rests when the latter reaches the end of its travel, is disposed at a greater angle to the back wall of said enlargement than in the case of the first described embodiment of the invention.

The parts just described co-operate as follows:—

Figure 4:
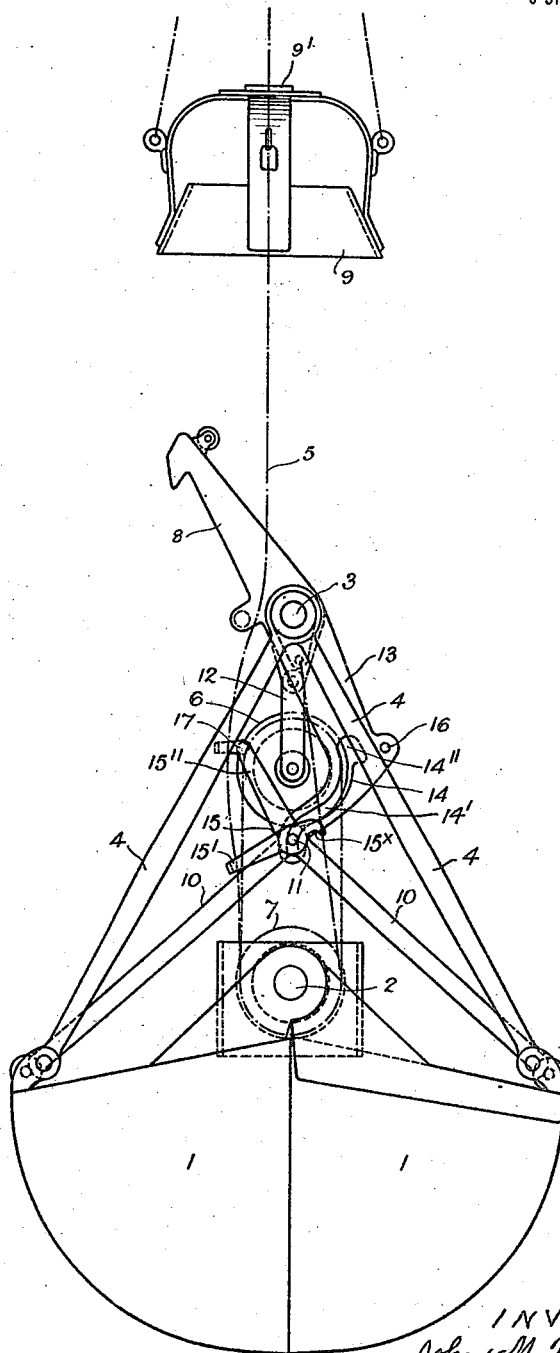
Fig. 4 is an end view.
Figure 6:
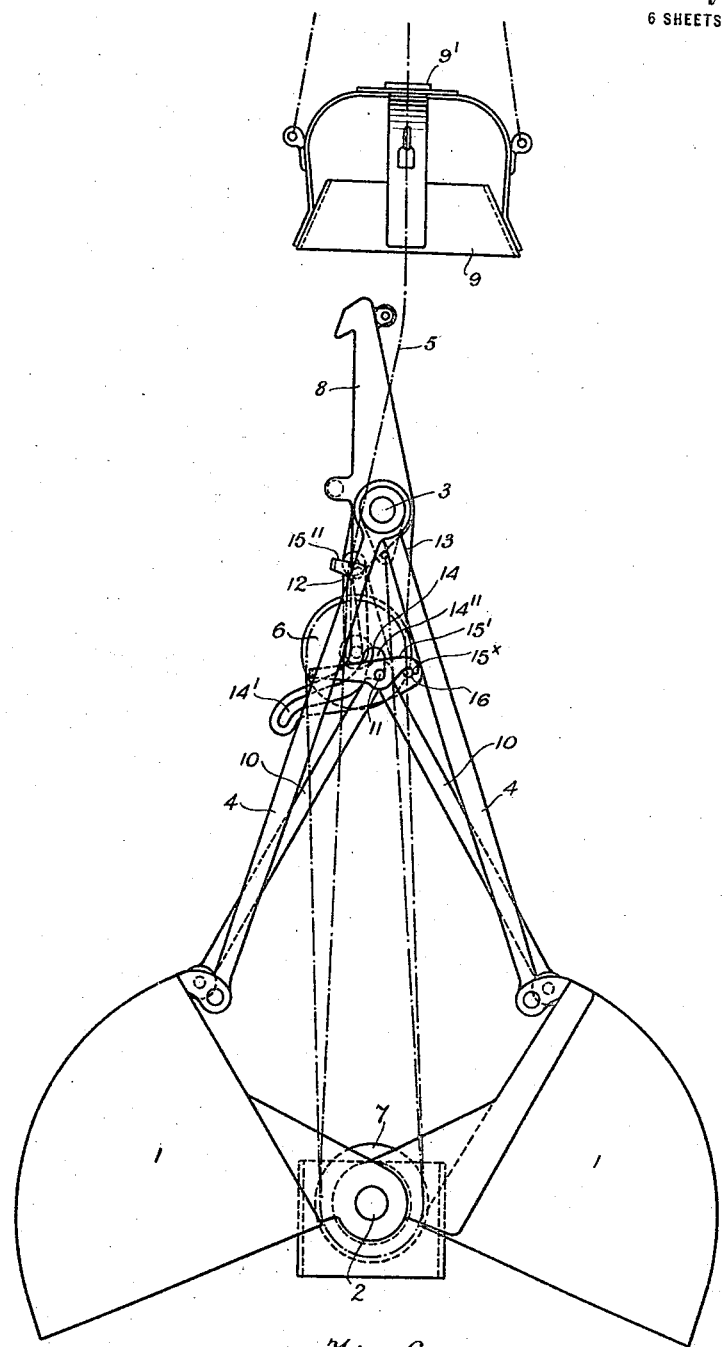
Fig. 6 is a second end view illustrating a sligthly modified construction of grab.

When the buckets are closed the arms $15^1$ of the locking lever 15 will be disengaged from the pin 16, as shown in Fig. 4, but when the buckets are opened out to discharge the load and the pin 11 passing up the cam slot 14 in the tail piece 13 of the suspending hook 8 reaches the end of its travel the notches $15^x$ in the arms $15^1$ of the locking lever 15 will become engaged with the pin 16 fixed to the tail piece 13 of the suspending hook 8 and will remain in engagement therewith owing to the lifting rope or chain 5 bearing against the friction roller 17. When after the grab has been lowered to pick up a fresh load and the buckets have come into contact with the material to be raised the lifting rope or chain 5 is slackened the locking lever 15 will, owing to the weight of its upstanding arm $15^{11}$, rock on the pin 11 and the notches $15^x$ will become disengaged from the pin 16, so allowing the pin 11 to pass out of the enlargement $14^{11}$ of the cam slot 14.

An important advantage of the present invention is that the opening ring or bonnet can always be kept absolutely central with the lifting rope or chain, as the collet $9^1$ of the opening ring or bonnet 9 can be made of a size corresponding to the lifting rope or chain 5. This is a most important advantage when a grab is being worked in high winds or in a bad light.

Having now described our invention what we have invented and desire to secure by Letters Patent of the United States is as follows:—

1. A grab, comprising, in combination, an opening ring loosely supported above said grab, a suspending hook pivotally connected with the grab and adapted to engage said opening ring, and cooperating means carried by the grab and said suspending hook for positively controlling from the grab the angular position of said suspending hook with respect to the center line of the grab, thereby to permit opening and closing of said grab.

2. A grab provided with means operated from the buckets of the grab for automatically controlling the angular position of the suspending hook of the grab with respect to the centre line of the grab, said means consisting of a tail piece to said suspending hook, a cam slot in said tail piece having an enlargement at its upper end, a pin traversing and engaging with the sides of said cam slot, and pairs of links, of lesser length than the links used for operating the buckets of the grab, connected at their lower ends to the buckets of the grab and mounted at their upper ends on said pin, substantially as described.

3. A grab provided with means operated from the buckets of the grab for automatically controlling the angular position of the suspending hook of the grab with respect to the centre line of the grab, said means consisting of a tail piece to said suspending hook, a cam slot in said tail piece having an enlargement at its upper end, a pin traversing and engaging with the sides of said cam slot, pairs of links, of lesser length than the links used for operating the buckets of the grab, connected at their lower ends to the buckets of the grab and mounted at their upper ends on said pin, and a locking lever co-operating with the lifting rope or chain of the grab, mounted on said pin, and serving as a means for retaining said pin in the enlargement at the upper end of said cam slot whilst the buckets are to remain fully open, substantially as described.

In testimony whereof, we affix our signatures.

JOHN MORECRAFT WELLINGTON.
DUNCAN GORDON MACKENZIE.